United States Patent [19]

Norton et al.

[11] Patent Number: 5,306,517
[45] Date of Patent: Apr. 26, 1994

[54] WATER-IN-OIL DISPERSION AND PROCESS FOR PREPARING SUCH DISPERSION

[75] Inventors: Ian T. Norton, Rushden, Great Britain; Jeffrey Underdown, Hamburg, Fed. Rep. of Germany

[73] Assignee: Van Den Bergh Foods Co., Division of Conopco Inc, Lisle, Ill.

[21] Appl. No.: 904,911

[22] Filed: Jun. 26, 1992

Related U.S. Application Data

[60] Division of Ser. No. 807,023, Dec. 10, 1991, Pat. No. 5,151,290, which is a continuation of Ser. No. 521,517, May 10, 1990, abandoned.

[30] Foreign Application Priority Data

May 16, 1989 [EP] European Pat. Off. ......... 89201209.7
Feb. 19, 1990 [EP] European Pat. Off. ......... 90200386.2

[51] Int. Cl.$^5$ ............................................. A23D 7/00
[52] U.S. Cl. ................................. 426/602; 426/603; 426/576
[58] Field of Search ............... 426/576, 602, 603, 663, 426/804

[56] References Cited

U.S. PATENT DOCUMENTS

| | | |
|---|---|---|
| 4,305,970 | 12/1981 | Moran et al. |
| 4,389,426 | 6/1983 | Reissmann et al. |
| 4,414,236 | 11/1983 | Moran et al. |
| 4,591,507 | 5/1986 | Bodor et al. |
| 4,849,243 | 7/1989 | Sreenivasan et al. |
| 4,883,681 | 11/1989 | Ernsting ............................ 426/602 |
| 4,917,915 | 4/1990 | Cain et al. |
| 4,943,445 | 7/1990 | Norton et al. |
| 4,956,193 | 9/1990 | Cain ................................... 426/602 |

FOREIGN PATENT DOCUMENTS

| | | |
|---|---|---|
| 237120 | 9/1987 | European Pat. Off. |
| 0279498 | 8/1988 | European Pat. Off. ........... 426/602 |
| 279499 | 8/1988 | European Pat. Off. |
| 293980 | 12/1988 | European Pat. Off. |
| 297690 | 1/1989 | European Pat. Off. |
| 380170 | 8/1990 | European Pat. Off. |
| 387940 | 9/1990 | European Pat. Off. |
| 11891 | 11/1990 | European Pat. Off. |
| 1094268 | 12/1967 | United Kingdom. |
| 2035360 | 6/1980 | United Kingdom. |
| 2084171 | 4/1982 | United Kingdom. |

*Primary Examiner*—Carolyn Paden
*Attorney, Agent, or Firm*—A. Kate Huffman

[57] ABSTRACT

The present invention is concerned with a process for preparing a dispersion comprising a continuous fat phase and a dispersed gelled aqueous phase, wherein a water-continuous composition, containing at least 1% gelatin by weight of water, is cooled from above the gel setting temperature of the water-continuous composition to below said gel setting temperature and subjected to such conditions of shear that the water-continuous composition is converted into small gelled aqueous beads, after which a fat-continuous dispersion is formed while maintaining the temperature at below the gel melting temperature. Another aspect of the present invention is a dispersion comprising less than 23% by weight of a continuous fat phase and a dispersed gelled aqueous phase containing gelatin at a concentration of 1 to 7 times its critical concentration and optionally a combination of one or more gelling agents other than gelatin at a concentration below their critical concentration.

4 Claims, 1 Drawing Sheet

WATER-IN-OIL DISPERSION AND PROCESS FOR PREPARING SUCH DISPERSION

This application is a divisional application of U.S. Ser. No. 07/807023, filed Dec. 10, 1991, now U.S. Pat. No. 5,151,290, which is a continuation of U.S. Ser. No. 07/521,517, filed May 10, 1990, which is now abandoned.

BACKGROUND OF THE INVENTION

1. Field of the Invention

The present invention is concerned with a dispersion comprising a continuous fat phase and a dispersed gelled aqueous phase,, and a process for preparing such dispersion. In particular the present invention relates to the preparation of a water-in-oil dispersion of extremely low fat content, such as for instance a spread containing from 5 to 27 wt. % fat and a dispersed gelled aqueous phase.

2. Description of Related Art

In European patent application No. 0 237 120 spreads comprising less than 35 wt. % fat and a gel forming aqueous phase having a relatively high viscosity are described. These spreads are prepared by admixing the aqueous phase and fat phase at a temperature of 60° or 70° C. and further processing the emulsion so obtained through two cooled C-units or alternatively through a sequence of two cooled A-units followed by a high shear mixer. European patent application No. 0 237 120 furthermore describes very low fat spreads containing substantial amounts of gelatin.

Gelatin is a gelling agent that gels very slowly. Accordingly, when gelatin is used in conventional processes for the preparation of spreads containing a gelling aqueous phase, a gelatin gel-structure is only formed after a fat-continuous emulsion has been obtained. In such processes during the in-line processing of the water-continuous gelatin-containing composition, the aqueous phase therefore has not yet developed a gel structure.

We have found now that stable water-in-oil dispersions having very advantageous properties can be prepared by cooling a gelatin-containing water-continuous composition to a temperature below the gel setting temperature for a sufficiently long period of time to allow the formation of a gel structure, subjecting said water-continuous composition to shear so as to convert it into small gelled aqueous beads and forming a fat-continuous dispersion.

SUMMARY OF THE INVENTION

Accordingly one aspect of the present invention is a process for preparing a dispersion comprising a continuous fat phase and a dispersed gelled aqueous phase, wherein a water-continuous composition, containing at least 1% gelatin by weight of water, is cooled from above the gel setting temperature of the water-continuous composition to below said gel setting temperature and subjected to such conditions of shear that the water-continuous composition is converted into small gelled aqueous beads, after which a fat-continuous dispersion is formed while maintaining the temperature below the gel melting temperature.

DETAILED DESCRIPTION OF PREFERRED EMBODIMENTS

Figure 1:
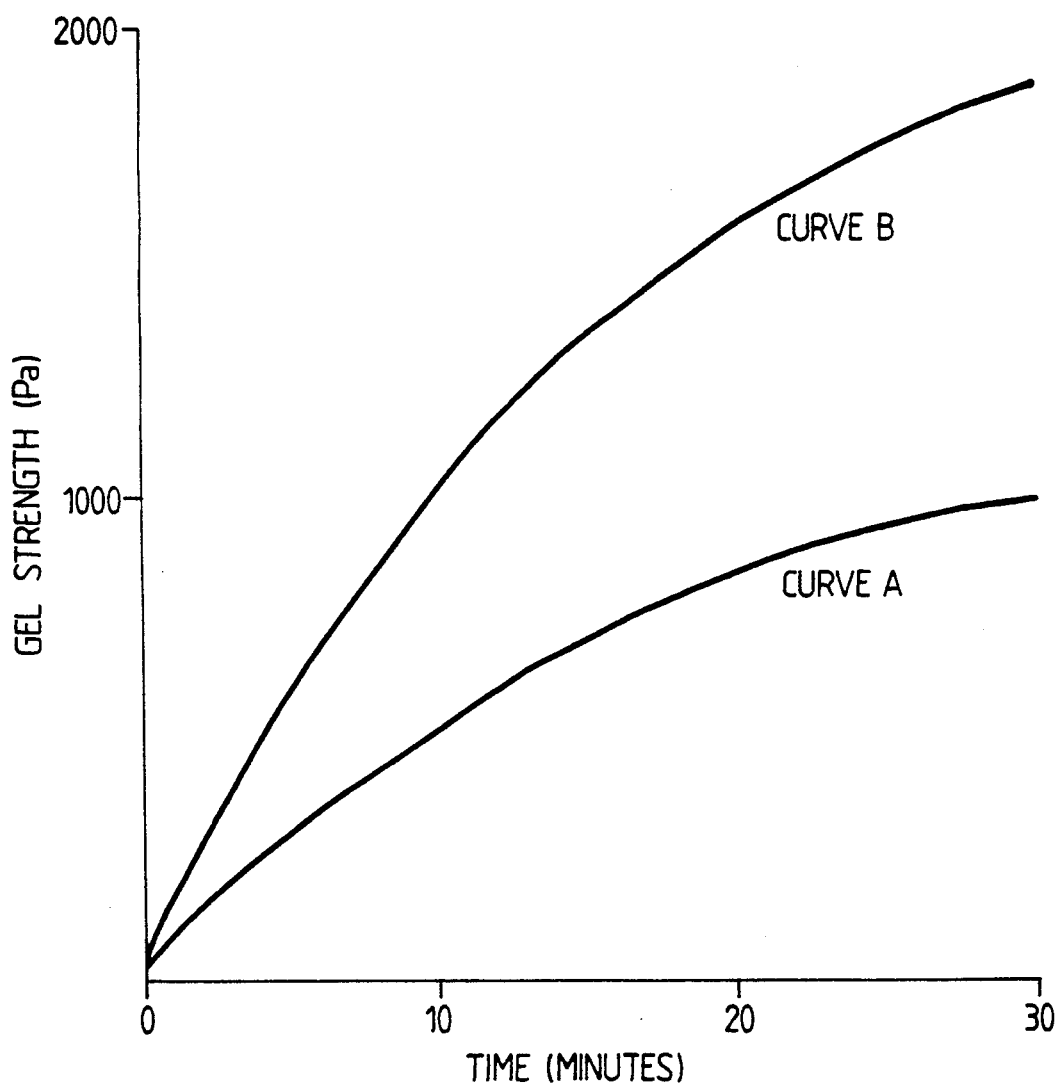
FIG. 1 is a graph illustrating gel strength as a function of time after rapid cooling of a composition according to the invention.

By the gel setting temperature as referred to in this application is meant the temperature at which, upon slowly cooling down a gelatin containing aqueous composition, an ordered gel structure is formed. The gel setting temperature of an aqueous composition can be determined by heating the composition to above the gel melting point, splitting it up in a number of samples which are subsequently equilibrated, under quiescent conditions, for 15 minutes at different temperatures lying 1 centigrade apart, and putting a steel ball of about 1 mm diameter on each of the samples after equilibration. The samples are ordered in accordance with the temperature at which the samples were equilibrated, starting from the sample equilibrated at the highest temperature. The gel setting temperature is the equilibration temperature of the first sample through which the steel ball does not sink.

The melting temperature of a gel can suitably be measured using the following procedure: Pour a sample into a glass test tube and allow it to set fully at 5° C. Then place the tube in a water jacket connected to a programmable water bath. Place a steel ball, having a diameter of approximately 1 mm, on the surface of the sample and depress slightly in order to minimize surface tension effects. Equilibrate for one hour at 25° C., or a lower temperature in case of a low melting gel, and then apply a heating regime of 0.05° C./min. The gel melting point is the temperature at which the ball begins to sink through the sample. Movement of the ball can be observed using a travelling microscope.

Generally the above procedures for measuring the gel melting and gel setting temperature will produce different temperatures. If, however, the cooling and heating procedure as described above were carried out at an extremely low rate of temperature change, the gel setting and gel melting temperature would be found to be identical.

The process according to the invention offers the advantage that it enables the preparation of water-in-oil dispersions of extremely low fat content even when using aqueous phase compositions which in the ungelled state do not possess a high viscosity. Also the present process makes it possible to incorporate ingredients into the aqueous phase which, in the absence of a gelled structure, would promote and actually induce the formation of an oil-in-water dispersion. Examples of such ingredients which promote the formation of water-continuous systems are: proteins, citric acid esters of monoglycerides, diacetyl tartic acid esters of monoglycerides, polyglycerol esters of fatty acids, polyorycethylene sorbitan esters of fatty acids, sucrose esters of fatty acids, stearoyl lactylates, sorbitan esters of fatty acids and lecithin.

Yet another advantage of the present process is the fact that it makes it possible to control the aqueous phase droplet size distribution in the final dispersion. The droplet size distribution of the aqueous phase is very important as regards the oral response, appearance and stability of water-in-oil dispersions. Also the release of flavour components from the dispersed aqueous phase is largely determined by the droplet size distribution of said aqueous phase. As contrasted to, for instance, the process described in EP-A 0 237 120, the present process can produce very low fat spreads containing an aqueous phase composed of relatively small droplets.

A further advantage of the present process is that the freshly prepared water-in-oil dispersion obtained by said process is less prone to destabilization or back-coalescence of water droplets than freshly prepared water-in-oil dispersions of identical composition when prepared by a conventional process. Directly after preparation, the latter dispersions contain a gelatin-containing dispersed aqueous phase which has not yet developed a gel structure and which are more easily inverted to a water-continuous composition than the dispersions obtained by the present process.

The advantages of the present process are particularly appreciated in the preparation of dispersions of very low fat content, i.e. dispersions containing less than 30 wt. % of a continuous fat phase. In a preferred embodiment, the present invention relates to a process for the preparation of a dispersion comprising from 5–27% by weight of the continuous fat phase and from 73–95% by weight of the dispersed gelled aqueous phase. The present process enables the preparation of stable dispersions containing extremely low levels of fat, i.e. substantially less than 25% by weight. Food products based on a dispersion having so low a fat content are particularly desirable because of their low caloric content. Thus in a very preferred embodiment of the invention the process relates to a process for preparing an edible dispersion comprising from 5–23 wt. % continuous fat phase and 92–77 wt. % dispersed gelled aqueous phase.

The gelled beads formed in the present process are generally difficult to visualize as in the present process the fat-continuous dispersion is normally formed before the gelation process is completed. As long as the gelation process is not completed, the gelled beads formed, when kept under quiescent conditions at below the gel melting temperature as is normally required if the gel beads are to be visualized by means of, for instance, a microscope, will tend to coalesce by cross-linking.

In this specification, unless otherwise indicated, the term 'fat' refers to edible fatty substances in a general sense, including natural or synthesized fats and oils consisting essentially of triglycerides such as, for example, soybean oil, sunflower oil, palm oil, coconut oil, fish oil, lard and tallow, which may have been partially or completely hydrogenated or modified otherwise, as well as non-toxic fatty materials having properties similar to triglycerides, which materials may be indigestible, such as for example waxes, e.g. jojoba oil and hydrogenated jojoba oil, and polyol fatty acid polyesters referred to hereinafter in more detail. The terms fat and oil are used interchangeably.

In this specification the term 'polyol' is intended to refer to any aliphatic or aromatic compound which comprises at least four free hydroxyl groups. Such polyols in particular include the group of sugar polyols, which comprises the sugars, i.e. the mono-, di- and oligosaccharides, the corresponding sugar alcohols and the derivatives thereof having at least four free hydroxyl groups. Examples of sugar polyols include glucose, mannose, galactose, xylose, fructose, sorbose, tagatose, ribulose, xylulose, maltose, lactose, cellobiose, raffinose, sucrose, erythritol, mannitol, lactitol, sorbitol, xylitol and alpha-methylglucoside. A generally used and preferred sugar polyol is sucrose.

In this specification the term 'polyol fatty acid polyester' is intended to refer to any such polyesters or mixtures thereof of which, on an average, more than 70% of the polyol hydroxyl groups have been esterified with fatty acids. In this specification by 'indigestible' is meant that at least about 70% by weight of the material concerned is not digested by the human body.

We have found that the present process can very advantageously be employed in the production of spreads of very low fat content. The spreads prepared by the present process, even when having a fat content as low as about 20 wt. %, have an oral response which is very much alike commercially available spreads comprising about 40 wt. % fat. Furthermore the spreads are found to be stable on storage and do not loose water on spreading.

It is crucial that in the present process the gelatin-containing water-continuous composition is maintained at a sufficiently low temperature for such a period of time that the cross-linking mechanism leading to gelation starts to occur. In order to obtain a gel-structure it is generally advisable to maintain the water-continuous composition at a temperature below the gel setting temperature for at least 100 seconds prior to the formation of the fat-continuous dispersion. More preferably the water-continuous composition is maintained at a temperature of at least 5° C. below the gel setting temperature for at least 150 seconds prior to the formation of the fat-continuous dispersion.

In the present process gelling agents such as native starch, hydrolized starch and starch derivatives can beneficially be combined with gelatin. The inclusion of relatively low concentrations of the latter starches was found to substantially increase the gelation rate of gelatin and therefore can help to speed up the process according to the invention. In particular starches selected from the group consisting of waxy starch, hydrolized starch, cross-linked strach can beneficially be included in the water-continuous composition. The latter starches offer the advantages that they exhibit essentially no retrogradation even when the dispersion is stored over a prolonged period of time. An example of a cross-linked starch that can suitably be used in accordance with the invention is maltodextrin.

When gelling starches are included in the water-continuous composition of the present process, the total concentration of these gelling starches should remain below 3 times, preferably below 1 time the critical concentration of the gelling starch or combination of gelling starches used. Non-gelling starches do not have a critical concentration.

Best results are obtained if the starch used in the present process is selected from the group consisting of cross-linked starch, native starch and mixtures thereof.

The increase in gelation rate obtained through the addition of native starch, hydrolized starch or a starch derivative, can be quantified by measuring the gel strength of the aqueous phase as a function of time in the presence and absence of said starches. The aqueous system should be cooled to 10° C. below the gel melting point of the aqueous system having the lowest gel setting temperature. The curve observed for the aqueous system containing starch will always lie above the curve for the starch-free system.

A suitable measure for the increase in gelation rate can be obtained by integrating the gel strength over 15 minutes, using the above cooling conditions, and dividing the figure obtained for the starch containing system by the figure obtained for the starch free system. Preferably the ratio so obtained exceeds 1.1, more preferably it exceeds 1.25. In FIG. 1 it is illustrated how the gel strength increases as a function of time immediately after an aqueous solution of 5% gelatin (Curve A) and an aqueous solution of 5% gelatin and 2.5% Remy rise TM starch (Curve B) have been rapidly cooled to 20° C. and kept at said temperature.

In the present process, preferably, the cooling regime and residence time employed before the formation of the fat-continuous dispersion are such that under quiescent conditions a gel having a shear storage modulus of more than 50 Pa., preferably of more than 70 Pa., is formed.

The following method can suitably be used to determine the shear storage modulus: Fit a Bohlin VOR Rheometer, or equivalent apparatus, with a 30 mm plate and 5 degree cone geometry. Heat the sample to a temperature at least 10° C. above its gel melting temperature and then bring it to the starting temperature employed in the process. Place the liquid sample to be tested between the cone and the plate and set the gap at the plate edge to be 1 mm. Apply silicone oil to the plate edge to prevent the sample from drying out.

Equilibrate the sample at the starting temperature and set the frequency of oscillation (f) to be 1 Hz and the strain to be 7.2 degrees. Apply a cooling regime as used in the process, maintain continuous sinusoidal oscillation and record compliant strain at convenient time intervals. The shear storage modulus (G') can then be calculated from the following relationship:

$G' = (\gamma_{21}°/\gamma_{21}°) \cos \delta$ where $\gamma_{21}° = \gamma_{21}/ \sin (\omega t + \delta)$ $\gamma_{21}° = \gamma_{21}/ \sin \omega t$ $\gamma$ is the shear stress $\gamma$ is the shear strain and $\delta$ is the phase angle More detailed information may be found in "Viscoelastic Properties of Polymers" by J. D. Ferry, Chapter 1, pages 4-16, Std Book Number 471 25774 5, published by J. Wiley & Sons Inc.

The conversion of the gelatin-containing water-continuous composition to small gelled aqueous beads can suitably be effected by means of several devices known in the art. Examples of suitable devices are: Votators TM (A-units), crystallizers (C-units), static mixers, Ultra Turax TM mixers, cavity transfer mixers etc. Preferably the conversion is effected by means of one or more devices in which the water-continuous composition can be cooled and/or subjected to shear. Preferably at least one of these devices is provided with rotating means for imparting shear to said composition.

The formation of the fat-continuous dispersion can suitably be accomplished by two alternative routes. The first route is a process wherein the water-continuous composition contains from 5 to 27% by weight of dispersed fat and is inverted to a fat-continuous dispersion after the fat-containing water-continuous composition has been converted to gelled aqueous beads. The word 'inversion' is used here to indicate that a water-continuous system containing a dispersed fat phase is converted into a water-in-oil dispersion. Such a water-continuous system in accordance with the invention can be composed of numerous small gelled aqueous beads containing dispersed fat droplets. It is to be understood that the inversion of a water-continuous composition to a water-in-oil dispersion in the present process is normally not an instantaneous event. Indeed the inversion of a water-continuous fat-containing composition to a water-in-oil dispersion can involve the formation of a transient bi-continuous system or a transient system which is partly fat- and partly water-continuous.

The second route is a process wherein the water-continuous composition after having been converted to small gelled aqueous beads is combined with a separate fat-continuous stream to form a fat-continuous dispersion. This process differs from the first route in that the fat is added after the aqueous phase composition of the final dispersion has been converted to gelled aqueous beads. Although the aqueous phase composition may already contain some dispersed fat, it is preferred that the bulk of the fat as present in the final dispersion is added in a separate fat-continuous stream after the gelled aqueous beads have been formed. The combination of the water-continuous with the fat-continuous stream preferably is carried out in such a manner that a fat-continuous system is formed, rather than a water-continuous system which additionally needs to be inverted to the final water-in-oil dispersion. If, as is the case in the present process, the gelled beads to be combined with the fat are sufficiently structured, the fat can easily be worked around the gelled beads to form a fat-continuous dispersion.

In both routes described above, after the gelled beads have formed, the further steps required to form a water-in-oil dispersion, preferably involve the application of shear to either invert the fat-containing gelled beads, or alternatively to thoroughly admix the gelled beads and the fat stream. Since these shear conditions may reduce the average size of the gelled beads, it is not necessary that, before formation of the fat-continuous dispersion, the gelled beads are of the size aimed for in the final product. Thus the gelled beads may be relatively large before incorporation, however generally have a size of less than 150 microns. In a preferred embodiment of the invention the gelled beads have attained a relatively small size before the formation of the fat-continuous dispersion. Thus advantageously the gelled beads have a volume weighted mean diameter of less than 150 microns, more preferably of less than 100 microns, prior to the formation of the fat-continuous dispersion. Normally the small gelled aqueous beads have a volume weighted mean diameter of more than 1 micron before the formation of the fat-continuous dispersion.

The present process enables the large scale production of high quality very low fat spreads. Accordingly, in a very preferred embodiment of the process, the fat-continuous dispersion is formed at a throughput of at least 0.5 ton/hr.

Another aspect of the present invention is a dispersion comprising less than 23% by weight of a continuous fat phase and a dispersed gelled aqueous phase containing gelatin at a concentration of 1 to 7 times its critical concentration and optionally a combination of one or more gelling agents other than gelatin at a concentration below their critical concentration. Despite the very low fat content, the spreads according to the present invention are very stable, i.e. they do not display water- or oil exudation even when subjected to temperature cycling nor do they loose water on spreading. Furthermore the present spreads have a significantly better oral response than spreads of similar fat content described in the prior art. This improved oral response may be explained from the favourable properties of gelatin which heretofore could not be used in the preparation of fat-continuous dispersions containing less than 23 wt. % fat unless a substantial amount of another gelling agent was included.

In European patent application No. 0 237 120 a spread comprising 20% by weight of a continuous fat phase and an aqueous phase containing 2 wt. % gelatin and 14.5 wt. % maltodextrin as well as a spread containing 25% by weight of a continuous fat phase and an aqueous phase comprising 5 wt. % gelatin have been described. The processing techniques described in that document do not allow the preparation of spreads of the type presently claimed.

In a very preferred embodiment of the present invention the dispersion is a spread containing 1.5 to 7.0% gelatin by weight of the aqueous phase. Spreads having such a gelatin content are easy spreadable, do not loose water on spreading, and do not give a thick mouthfeel. The present invention enables the preparation of fat-continuous very low fat spreads containing a gelled aqueous phase which need not have a high viscosity, i.e. having a viscosity of less than 30 mPa.s, or even less than 25 mPa.s at a temperature of 5° C. and a shear rate of 17090 sec.$^{-1}$, using the test described in EP-A 0 237 120.

The critical concentration of a gelling agent is the concentration level at which said gelling agent will start to form a gel. The critical concentration of gelatin in the aqueous phase of the present dispersion is determined in an aqueous system which has exactly the same composition as the aqueous phase to be incorporated into the spread (except for the absence of other gelling agents which optionally may be included therein and with the exception of the water content and the gelatin concentration which have to be varied to establish the critical concentration).

The critical concentration of a gelling agent in a particular composition can be calculated from measurements of the shear modulus of a series of samples containing different concentrations of gelling agent, as described in Br. Polymer J. 17 (1985), 164. If the critical concentration of a combination of gelling agents is to be determined, then the critical concentration of such mixture of gelling agents is determined in a manner analogous to the procedure described above. The composition of the mixture of gelling agents is kept constant and the weight concentration of said mixture is varied as if it consisted of only one single gelling agent.

The dispersions obtained by the present process can have a structure which is different from the structure observed in spreads made via traditional processing. This difference can be explained from the fact that the aqueous phase in the present dispersion is obtained through 'breaking up' a gelling aqueous phase, resulting in gelled beads which show the results of this breaking up treatment in the form of an irregular shape, which irregular shape is retained in the final dispersion. By an irregular shape we here mean that the aqueous gelled droplets in the present dispersion, unlike such droplets in dispersions obtained via conventional routes, when viewed under a microscope at adequate magnification, have a non-spherical, non-ellipsoidal form.

In dispersions obtained via conventional processing the dispersal of the aqueous phase into the fat phase is largely realized before gelation of the gelatin is effectively initiated. Thus, due to the surface tension, the aqueous droplets in the dispersion formed have a very regular form before gelation is initiated. This gelation results in a fixation of this regular droplet-form within the dispersion and consequently in a water-in-oil dispersion containing gelled regularly shaped aqueous droplets.

The size of the gelled aqueous phase droplets to a large extent determines the appearance, oral response and rheology of the dispersion. In the present dispersion, preferably, these gelled droplets have a number weighted average droplet size of less than 50 microns, preferably of less than 30 microns.

We have found it very advantageous to include in the dispersion an effective amount of an O/W promoter, i.e. an ingredient which promotes the formation of a water-continuous system. The inclusion of such a promoter offers the advantages that at mouth temperature, when fat phase and gel start melting, destabilization and consequent flavour release are induced. Thus the incorporation of O/W promoters can significantly improve the oral response of the present dispersion. In a preferred embodiment of the present invention the aqueous phase contains at least 0.02 wt. %, preferably from 0.05 to 1.0 wt. % of an O/W-promoter selected from the group consisting of protein, citric acid esters of monoglycerides, diacetyl tartic acid esters of monoglycerides, polyglycerol esters of fatty acids, polyorycethylene sorbitan esters of fatty acids, sucrose esters of fatty acids, stearoyl lactylates, sorbitan esters of fatty acids, lecithin and mixtures thereof. Preferably the aqueous phase of the present dispersion contains at least 0.02 wt. % protein. The term protein when used in connection with O/W promoters, does not include gelatin.

The aqueous phase of the present dispersions preferably contains at least 5 ppm of water-soluble flavour compounds. Most preferably these flavour compounds are butter flavour compounds.

The invention is further illustrated by means of the following examples:

Example 1

A spread containing 20 wt. % of a continuous fat phase and 80 wt. % of a dispersed gelled aqueous phase was prepared from a water-continuous emulsion obtained by admixing an oil phase and aqueous phase of the following composition:

| Oil phase (in wt. % on emulsion) | |
|---|---|
| Fat blend containing 50% soybean oil, 13% coconut oil, 17% soybean oil hardened to 41° C. and 20% of soybean oil hardened to 33° C. | 19.7 |
| Hymono 4404 TM (monoglycerides) | 0.3 |
| Flavouring material | 0.005 |
| Beta-carotene (30% conc.) | 0.0025 |
| Aqueous phase (in wt. % on emulsion) | |
| Geltec TM Gelatin (bloom 270) | 4.4 |
| Sodium Chloride | 1.44 |
| Potassium Sorbate | 0.16 |
| Water | 74.0 |

The water-continuous emulsion obtained after admixture of the above two phases at 50° C. was pasteurized at 80° C. and subsequently (at a throughput of 30 kg/hr) passed through two water-cooled cooling coils, a scraped surface heat exchanger (in this case an ammonia cooled Votator TM; also called an A-unit) and two crystallizers (C-units) after which the product was filled into tubs. Inversion of the water-continuous emulsion to a fat-continuous dispersion was obtained in the second C-unit, operated at 500 rpm. After a fat-continuous product was obtained from the end of the line, the throughput was increased to 60 kg/hr and the rotation speed of the second C-unit was raised to 1500 rpm while maintaining essentially the same processing temperatures and rotation speeds previously applied. The precise processing conditions in the units are recited below.

|  | Exit Temp. (°C.) | Rotation Speed (rpm) | Residence Time |
| --- | --- | --- | --- |
| First cooling coil | 26 |  | 1 min. |
| Second cooling coil | 21 |  | 3 min. |
| A-unit | 6 | 700 | 1 min. |
| First C-unit | 10 | 150 | 5 min. |
| Second C-unit | 24 | 1500 | 5 min. |

The fat-continuous spread so obtained was found to be easy spreadable and did not loose water on spreading. The product had a conductivity at 5° C. of $55 \times 10^{-6}$ Siemens/cm indicating that it contained a continuous fat phase and a discontinuous aqueous phase. The volume weighted mean diameter of the aqueous phase was determined by means of pulse NMR and found to be 55 microns. The hardness of the product at 5° C. as determined by means of a cone penetrometer was found to be 610 g/cm$^2$.

The water-continuous composition obtained after admixture of the oil phase and the aqueous phase, within a period of time substantially shorter than the total residence time in the cooling coils, A-unit and first C-unit, attained a shear modulus of more than 100 Pa. when subjected under quiescent conditions to the cooling regime used in the above process.

Example 2

Example 1 was repeated, with the exception that the aqueous phase used had the following composition:

| Aqueous phase |  |
| --- | --- |
| Geltec TM Gelatin (bloom 270) | 5.6 |
| Salt | 1.44 |
| Potassium sorbate | 0.16 |
| Water | 72.8 | pH adjusted to 4.9 using lactic acid

The fat-continuous spread obtained had an even better spreadability than the spread obtained in Example 1. The conductivity at 5° C. was found to be $0.9 \times 10^{-6}$ Siemens/cm and the volume weighted mean droplet size 51 microns. The hardness-values at 5°, 10°, 15° and 20° C. were found to be 820, 575, 270 and 195 g/cm$^2$ respectively. The product was found to be a bit thicker in the mouth than the product described in Example 1.

Example 3

Example 1 was repeated, with the exception that the aqueous phase used had the following composition:

| Aqueous phase |  |
| --- | --- |
| Geltec TM Gelatin (bloom 270) | 4.8 |
| Salt | 1.44 |
| Potassium sorbate | 0.16 |
| Water | 73.6 | pH adjusted to 4.9 using lactic acid

Example 4

A spread containing 20 wt. % of a continuous fat phase and 80 wt. % of a dispersed gelled aqueous phase was prepared from a water-continuous emulsion obtained by admixing an oil phase and aqueous phase of the following composition:

| Oil phase (in wt. % on emulsion) |  |
| --- | --- |
| Fat blend containing 50% soybean oil, 13% coconut oil, 17% soybean oil hardened to 41° C. and 20% of soybean oil hardened to 33° C. | 19.7 |
| Hymono 4404 TM (monoglycerides) | 0.3 |
| Flavouring material | 0.004 |
| Beta-carotene (30% conc.) | 0.004 |
| Aqueous phase (in wt. % on emulsion) |  |
| Geltec TM Gelatin (250 bloom) | 3.2 |
| Sodium Chloride | 1.1 |
| Water | 75.7 | pH adjusted to 5.2 using lactic acid

The water-continuous emulsion obtained after admixture of the above two phases at 40° C. was (at a throughput of 13 g/min) passed through two scraped surface heat exchangers (in this case a Votator TM cooled with ethylene glycol) and two crystallizers (C-units) after which the product was filled into tubs. The precise processing conditions in these units are recited below.

|  | Exit Temp. (°C.) | Rotation Speed (rpm) | Residence Time |
| --- | --- | --- | --- |
| First A-unit | 1.7 | 1250 | 50 s. |
| Second A-unit | 2.0 | 1250 | 50 s. |
| First C-unit | 4.0 | 650 | 690 s. |
| Second C-unit | 21 | 680 | 690 s. |

Inversion of the water-continuous emulsion to a fat-continuous dispersion was obtained in the second C-unit. The fat-continuous spread so obtained was found to have a conductivity at 5° C. of $33 \times 10^{-6}$ Siemens/cm and had a volume weighted mean droplet size of 40 microns. The hardness-values at 5° C. was 480 g/cm$^2$. The spread was judged to have a very good oral response and was easy spreadable with no water-loss being observed.

It was found that, once a suitable product was obtained while utilizing the above processing conditions, the throughput and rotation speed of the second C-unit could be increased to substantially higher levels without any severe adverse effects on the product quality.

Example 5

Example 4 was repeated with the exception that the gelatin level employed was increased to 4.0 wt. % and the throughput used was 17 g/min.

The precise processing conditions applied were as follows:

|  | Exit Temp. (°C.) | Rotation Speed (rpm) | Residence Time |
| --- | --- | --- | --- |
| First A-unit | 1 | 1250 | 39 s. |
| Second A-unit | 1 | 1250 | 39 s. |
| First C-unit | 3 | 600 | 530 s. |
| Second C-unit | 22 | 650 | 530 s. |

Inversion of the water-continuous emulsion to a fat-continuous dispersion was again obtained in the second C-unit. The fat-continuous spread so obtained was found to have a conductivity at 5° C. of 26×10$^{-6}$ Siemens/cm and had a volume weighted mean droplet size of 32 microns. The hardness-values at 5° C. was 550 g/cm$^2$.

Again it was found that the throughput and rotation speed of the second C-unit could substantially be increased without any adverse effects on the product quality.

Example 6

A spread containing 20 wt. % of a continuous fat phase and 80 wt. % of a dispersed gelled aqueous phase was prepared from a water-continuous emulsion obtained by admixing an oil phase and aqueous phase of the following composition:

| Oil phase (in wt. % on emulsion) | |
|---|---|
| Fat blend containing 20% soybean oil, 60% sunflower oil and 20% soybean oil hardened to 44 | 19.66 |
| Hymono 4404 TM (monoglycerides) | 0.3 |
| Flavouring material | 0.04 |
| Beta-carotene (30% conc.) | 0.004 |
| Aqueous phase (in wt. % on emulsion) | |
| Geltec TM Gelatin (bloom 270) | 3.20 |
| Remyrise TM (rice starch) | 2.00 |
| Sodium Chloride | 2.00 |
| Potassium Sorbate | 0.13 |
| Water | 72.67 | pH adjusted to 5.3 using lactic acid

The water-continuous emulsion obtained after admixture of the above two phases at 50° C. was pasteurized at 80° C. and subsequently (at a throughput of 50 g/min) passed through two scraped surface heat exchangers (A-units) and two crystallizers (C-units) provided with cooling jackets, after which the product was filled into tubs. Inversion of the water-continuous emulsion to a fat-continuous dispersion was obtained in the second C-unit.

The precise processing conditions in the units are recited below.

| | Exit Temp. (°C.) | Rotation Speed (rpm) | Residence Time |
|---|---|---|---|
| First A-unit | 10 | 500 | 15 sec. |
| Second C-unit | 5 | 500 | 15 sec. |
| First C-unit | 8 | 1400 | 180 sec. |
| Second C-unit | 19 | 1400 | 180 sec. |

The fat-continuous spread so obtained was found to have a conductivity at 5° C. of 31×10$^{-6}$ Siemens/cm. The hardness-value at 5° C. was 150 g/cm$^2$. The product displayed acceptable spreadability.

Example 7

A spread containing 20 wt. % of a continuous fat phase and 80 wt. % of a dispersed gelled aqueous phase was prepared from a water-continuous emulsion obtained by admixing an oil phase and aqueous phase of the following composition:

| Oil phase (in wt. % on emulsion) | |
|---|---|
| Fat blend containing 20% palm oil, 45% rape seed oil and 35% rape seed oil hardened to 32° C. | 19.49 |
| Hymono 7804 TM (monoglycerides) | 0.50 |
| Flavouring material | 0.01 |
| Beta-carotene (30% conc.) | 0.010 |
| Aqueous phase (in wt. % on emulsion) | |
| Geltec TM Gelatin (bloom 270) | 4.0 |
| Paselli SA2 TM (maltodextrin) | 2.0 |
| Sodium Chloride | 1.15 |
| Potassium Sorbate | 0.13 |
| Water | 72.72 | pH adjusted to 4.8 using lactic acid

The water-continuous emulsion obtained after admixture of the above two phases at 50° C. was pasteurized at 80° C. and subsequently (at a throughput of 51 g/min) passed through two scraped surface heat exchangers (A-units) and two crystallizers (C-units) provided with cooling jackets, after which the product was filled into tubs. Inversion of the water-continuous emulsion to a fat-continuous dispersion was obtained in the second C-unit.

The precise processing conditions in the units are recited below.

| | Exit Temp. (°C.) | Rotation Speed (rpm) | Residence Time |
|---|---|---|---|
| First A-unit | 6 | 150 | 15 sec. |
| Second A-unit | 4 | 1400 | 15 sec. |
| First C-unit | 10 | 1400 | 180 sec. |
| Second C-unit | 21 | 900 | 180 sec. |

An acceptable fat-continuous product was obtained.

Example 8

A spread containing 20 wt. % of a continuous fat phase and 80 wt. % of a dispersed gelled aqueous phase was prepared from a water-continuous emulsion obtained by admixing an oil phase and aqueous phase of the following composition:

| Oil phase (in wt. % on emulsion) | |
|---|---|
| Fat blend containing 80% sunflower oil and 20% soybean oil hardened to 44° C. | 19.68 |
| Hymono 4404 TM (monoglycerides) | 0.30 |
| Flavouring material | 0.05 |
| Beta-carotene (30% conc.) | 0.003 |
| Aqueous phase (in wt. % on emulsion) | |
| Geltec TM Gelatin (bloom 270) | 4.50 |
| Ultra Tex 2 TM (cross-linked modified starch) | 2.00 |
| Sodium Chloride | 1.44 |
| Potassium Sorbate | 0.16 |
| Water | 71.87 | pH adjusted to 4.9 using lactic acid

The water-continuous emulsion obtained after admixture of the above two phases at 50° C. was pasteurized at 80° C. and subsequently (at a throughput of 90 kg/hr) passed through two scraped surface heat exchangers (A-units) and two crystallizers (C-units), after which the product was filled into tubs. Inversion of the water-continuous emulsion to a fat-continuous dispersion was obtained in the second C-unit.

The precise processing conditions in the units are recited below.

| | Exit Temp. (°C.) | Rotation Speed (rpm) | Residence Time |
|---|---|---|---|
| First A-unit | 5 | 600 | 24 sec. |
| Second C-unit | 5 | 600 | 24 sec. |

-continued

|  | Exit Temp. (°C.) | Rotation Speed (rpm) | Residence Time |
|---|---|---|---|
| First C-unit | 7 | 300 | 210 sec. |
| Second C-unit | 22 | 1250 | 210 sec. |

An acceptable fat-continuous product was obtained.

Example 9

Example 8 was repeated, with the exception that the cross-linked modified starch was replaced by the same amount of Remyrise AP TM pre-gelatinised starch. Again an acceptable fat-continuous product was obtained.

Example 10

A spread containing 20 wt. % of a continuous fat phase and 80 wt. % of a dispersed gelled aqueous phase was prepared from a water-continuous emulsion obtained by admixing an oil phase and aqueous phase of the following composition:

| Oil phase (in wt. % on emulsion) | |
|---|---|
| Fat blend containing 80% sunflower oil and 20% soybean oil hardened to 44° C. | 19.68 |
| Hymono 4404 TM (monoglycerides) | 0.30 |
| Flavouring material | 0.05 |
| Beta-carotene (30% conc.) | 0.003 |
| Aqueous phase (in wt. % on emulsion) | |
| Geltec TM Gelatin (bloom 270) | 4.5 |
| Ultra Tex 2 TM (cross-linked modified starch) | 2.0 |
| Sodium Chloride | 1.0 |
| Potassium Sorbate | 0.16 |
| Water | 71.87 | pH adjusted to 4.9 using lactic acid

The water-continuous emulsion obtained after admixture of the above two phases at 50° C. was pasteurized at 80° C. and subsequently (at a throughput of 1.0 ton/hr) passed through a series of scraped surface heat exchangers (A-units) and three crystallizers (C-units), after which the product was filled into tubs. Inversion of the water-continuous emulsion to a fat-continuous dispersion was obtained in the second C-unit. The third C-unit had a smaller volume (35 l.) than the two other C-units (100 l.).

The precise processing conditions in the units are recited below.

|  | Exit Temp. (°C.) | Rotation Speed (rpm) |
|---|---|---|
| First set of A-units (3) | 9 | 700 |
| Second set of A-units (2) | 4 | 500 |
| Third set of A-units (2) | 6 | 500 |
| First C-unit (100 l.) | 7 | 150 |
| Second C-unit (100 l.) | 23 | 700 |
| Third C-unit (35 l.) | 23 | 150 |

A fat-continuous very low fat spread having excellent appearance was obtained.

Example 11

Example 10 was repeated except that the Ultra Tex 2 TM cross-linked starch was replaced by the same amount of Remyrise AP TM rice starch. A very low fat spread of similar quality as the product described in Example 10, was obtained. Also the replacement of 2.0 wt. % Ultra Tex TM cross-linked starch by 3 wt. % Paselli SA2 TM maltodextrin was found to yield an acceptable very low fat spread.

Example 12

A spread containing 17 wt. % of a continuous fat phase and 83 wt. % of a dispersed gelled aqueous phase was prepared from a water-continuous emulsion obtained by admixing an oil phase and aqueous phase of the following composition:

| Oil phase (in wt. % on emulsion) | |
|---|---|
| Fat blend of Example 1 | 16.75 |
| Hymono 4404 TM (monoglycerides) | 0.25 |
| Aqueous phase (in wt. % on emulsion) | |
| Geltec TM Gelatin (bloom 270) | 4.67 |
| Ultra Tex 2 TM (cross-linked modified starch) | 1.87 |
| Sodium Chloride | 1.16 |
| Water | 75.30 |

The water-continuous emulsion obtained after admixture of the above two phases was pasteurized at 80° C. and subsequently passed through two scraped surface heat exchangers (A-units) and two crystallizers (C-units), after which the product was filled into tubs. Inversion of the water-continuous emulsion to a fat-continuous dispersion was obtained in the second C-unit.

The precise processing conditions in the units are recited below.

|  | Exit Temp. (°C.) | Rotation Speed (rpm) |
|---|---|---|
| First A-unit | 4 | 150 |
| Second A-unit | 2.5 | 1400 |
| First C-unit | 12 | 1400 |
| Second C-unit | 19 | 900 |

The fat-continuous very low fat spread so obtained had a conductivity of 7 microSiemens/cm at 15° C., was very good on spreading and had a volume weighted mean droplet size of about 70 microns.

Example 13

A spread containing 15 wt. % of a continuous fat phase and 85 wt. % of a dispersed gelled aqueous phase was prepared from a water-continuous emulsion obtained by admixing an oil phase and aqueous phase of the following composition:

| Oil phase (in wt. % on emulsion) | |
|---|---|
| Fat blend containing 57% soybean oil, 26% soybean oil hardened to 38° C. and 17% of an interesterified blend of palm oil (40) and palm kernel oil (60) | 14.7 |
| Hymono 4404 TM (monoglycerides) | 0.3 |
| Flavouring material | 0.005 |
| Beta-carotene (30% conc.) | 0.0025 |
| Aqueous phase (in wt. % on emulsion) | |
| Geltec TM Gelatin (bloom 270) | 4.25 |
| Remyrise TM (rice starch) | 2.125 |
| Sodium Chloride | 1.125 |
| Potassium Sorbate | 0.17 |
| Water to 100% | | pH adjusted to 5.3 using lactic acid.

The water-continuous emulsion obtained after admixture of the above two phases was pasteurized and subsequently (at a throughput of 60–90 kg/hr) passed through three scraped surface heat exchangers (A-units) and subsequently two crystallizers (C-units), after which the product was filled into tubs. Inversion of the water-continuous emulsion to a fat-continuous dispersion was obtained in the second C-unit. The precise processing conditions in the units are recited below.

|  | Exit Temp. (°C.) | Rotation Speed (rpm) |
|---|---|---|
| First A-unit | 6 | 300 |
| Second A-unit | 5 | 300 |
| Third A-unit | 4 | 300 |
| First C-unit (5 liter) | 7 | 100 |
| Second C-unit (3 liter) | 22-24 | 1800 |

The spread obtained had a conductivity of 1 microSiemens/cm at 5° C., was very good on spreading and was a smooth emulsion.

We claim:

1. A dispersion comprising less than 23% by wt. of a continuous fat phase and a dispersed gelled aqueous phase comprising gelatin at a concentration of 1.0 to 7.5 times its critical concentration and a combination of one or more gelling agents other than gelatin in a concentration below their critical concentration.

2. A dispersion according to claim 1, wherein the concentration of the one or more gelling agents is three times below their critical concentration.

3. A dispersion according to claim 1, wherein the dispersed gelled aqueous phase is composed of gelled droplets of irregular shape.

4. A dispersion according to claim 1, wherein the aqueous phase further comprises at least 0.02 wt. % of a oil-in-water promoter which promotes formation of a water continuous system selected from the group consisting of protein, citric acid esters of monoglycerides, decidual tactic acid esters of monoglycerides, polyglycerol esters of fatty acids, polyorycethylene sorbitan esters of fatty acids, sucrose esters of fatty acids, stearoyl lactylates, sorbitan esters of fatty acids, lecithin and mixtures thereof.

* * * * *